United States Patent
Dahbura et al.

(10) Patent No.: US 10,026,290 B2
(45) Date of Patent: Jul. 17, 2018

(54) BLUETOOTH BEACON SYSTEM FOR INDUSTRIAL MACHINE SAFETY

(71) Applicant: THE JOHNS HOPKINS UNIVERSITY, Baltimore, MD (US)

(72) Inventors: Anton T. Dahbura, Hagerstown, MD (US); Chi Hong Ho, Baltimore, MD (US); Sunyan Lee, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 15/092,683

(22) Filed: Apr. 7, 2016

(65) Prior Publication Data

US 2017/0092093 A1    Mar. 30, 2017

Related U.S. Application Data

(60) Provisional application No. 62/143,845, filed on Apr. 7, 2015.

(51) Int. Cl.
*G08B 21/02* (2006.01)
*G08G 1/16* (2006.01)
(Continued)

(52) U.S. Cl.
CPC .............. *G08B 21/02* (2013.01); *F16P 3/147* (2013.01); *G08B 13/00* (2013.01);
(Continued)

(58) Field of Classification Search
CPC .. G08B 21/02; G08B 21/0266; G08B 21/272; G08B 21/275; G08B 21/28; G08B 13/00;
(Continued)

(56) References Cited

U.S. PATENT DOCUMENTS

| 6,717,516 B2 | 4/2004 | Bridgelall |
| 8,023,895 B2 | 9/2011 | Smith |

(Continued)

FOREIGN PATENT DOCUMENTS

| WO | 2001058098 A2 | 8/2001 |
| WO | 2006133487 A1 | 12/2006 |

OTHER PUBLICATIONS

Behzadan, et al., Ubiquitous location tracking for context-specific information delivery on construction sites. Automation in Construction 2008; 17: 737-748.

(Continued)

*Primary Examiner* — Van Trieu
(74) *Attorney, Agent, or Firm* — Johns Hopkins Technology Ventures

(57) ABSTRACT

The present invention provides a system and method for increasing construction site safety. The present invention reduces the risk of a construction or similar large vehicle or piece of mobile machinery hitting a construction worker. The system uses low-power wireless beacons embedded in a construction worker's hardhat or otherwise on the construction worker's person. The low-power wireless beacon interacts with sensor modules around the construction site, on construction vehicles, on construction equipment, or any other suitable placement known to or conceivable by one of skill in the art. The sensor modules send alert signals to a display accessible to a driver of the vehicle, and/or a foreman on the construction site. While the present invention is discussed herein in the context of construction safety, it should be noted that such a system can be applied to any situation where tracking and alert generation would be beneficial.

20 Claims, 3 Drawing Sheets

(51) Int. Cl.
*G08B 13/00* (2006.01)
*F16P 3/14* (2006.01)
*H04B 1/034* (2006.01)

(52) U.S. Cl.
CPC ......... *G08B 21/0266* (2013.01); *G08G 1/166* (2013.01); *H04B 1/0343* (2013.01)

(58) Field of Classification Search
CPC .. G08B 13/1427; G08B 13/1481; G08C 9/00; G08C 9/12; G08C 9/16; G09B 19/0038; H04B 1/0343
See application file for complete search history.

(56) References Cited

U.S. PATENT DOCUMENTS

| | | | |
|---|---|---|---|
| 8,564,452 B2 | 10/2013 | Schaible et al. | |
| 9,579,048 B2 * | 2/2017 | Rayner | A61B 5/1118 |
| 2005/0200487 A1 * | 9/2005 | O'Donnell | A62B 99/00 340/573.1 |
| 2008/0125040 A1 | 5/2008 | Kalayjian | |
| 2009/0040053 A1 * | 2/2009 | White | G08B 21/0288 340/573.4 |
| 2009/0207014 A1 * | 8/2009 | Ayed | G08B 13/1427 340/539.13 |
| 2014/0087752 A1 | 3/2014 | Zhu et al. | |
| 2015/0278263 A1 * | 10/2015 | Bowles | A63F 13/219 463/43 |

OTHER PUBLICATIONS

Teizer, et al., Autonomous pro-active real-time construction worker and equipment operator proximity safety alert system. Automation in Construction 2010; 19: 630-640.

Marks, et al., Proximity Sensing and Warning Technology for Heavy Construction Equipment Operation. Construction Research Congress 2012.

* cited by examiner

BLUETOOTH BEACON SYSTEM FOR INDUSTRIAL MACHINE SAFETY

CROSS REFERENCE TO RELATED APPLICATIONS

This application claims the benefit of U.S. Provisional Patent Application No. 62/143,845 filed Apr. 7, 2015, which is incorporated by reference herein, in its entirety.

FIELD OF THE INVENTION

The present invention relates generally to worksite safety. More particularly the present invention relates to a system and method for tracking worker and machinery proximity at a worksite.

BACKGROUND OF THE INVENTION

Construction is a high hazard industry. Not only are workers engaging in manual labor with heavy materials and machinery, they are also in an environment with machinery that is being operated and moved around in tight spaces and with limited visibility. While hard hat rules have been implemented in order to provide some level of protection to these workers, the hard hat only goes so far and cannot protect from accidental run-ins with moving equipment such as excavators, cranes, bulldozers, and dump trucks that may or may not see workers.

It would therefore be advantageous to provide a tracking system and method for providing safety to workers on a construction site.

SUMMARY

Figure 1:
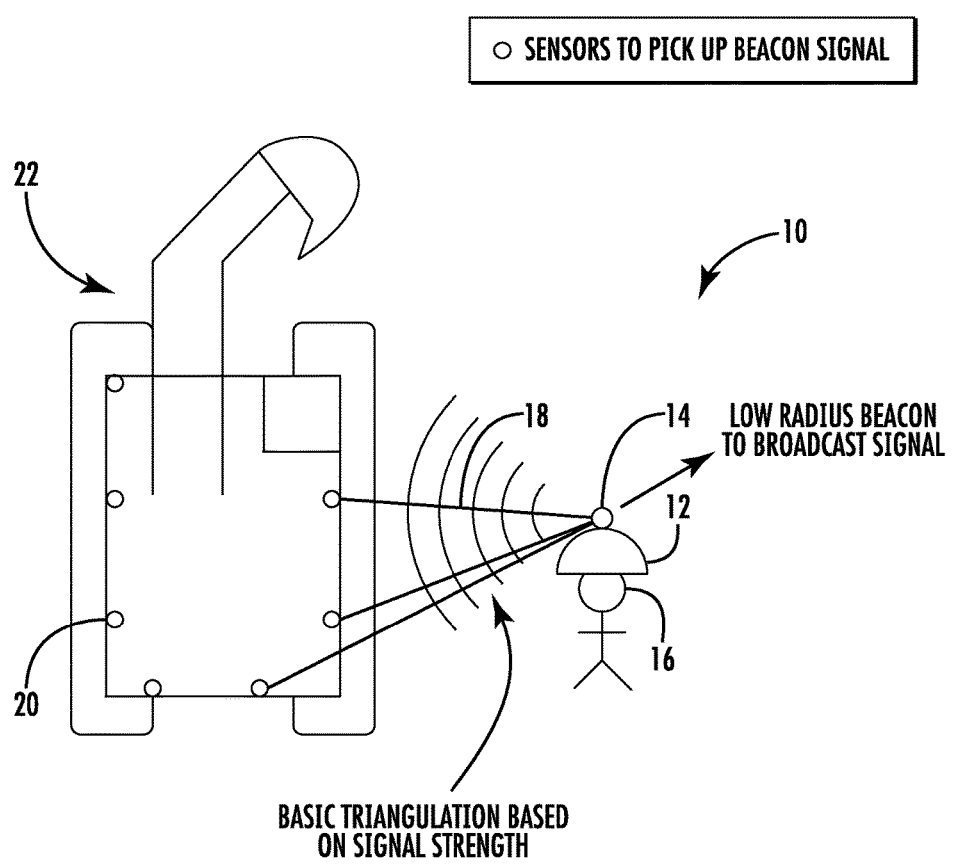
FIG. 1 illustrates a schematic diagram of a system for tracking a subject, according to an embodiment of the present invention.

The foregoing needs are met, to a great extent, by the present invention, which provides a system for tracking proximity of a tracking module to a sensing module including a sensor module having a short-range radio frequency emitter/receiver and a microcontroller. The system includes a tracking module having a short-range frequency emitter and an LED light. The LED light is configured to be lit when the tracking module is operating and off when the tracking module is not operating. The tracking module emits a signal received by the sensor module and triangulation is used to determine proximity of the tracking module to the sensor module. The system also includes a display. The display is in communication with the sensor module, such that the sensor module transmits data for display related to the proximity of the tracking module to the sensor module.

In accordance with an aspect of the present invention, the tracking module is part of a hard hat. The system is further configured for use in a construction site. Several sensor modules are placed around the perimeter of construction equipment. The display is incorporated into one selected from a smartphone, tablet, phablet, computing device, personal computer, and construction equipment computer. The short-range frequency emitter takes the form of a Bluetooth® Low Energy transmitter. The system can include a network for facilitating communication between the sensor module, the tracking module, and the display. The tracking module includes a battery that can be rechargeable. Additionally, the sensor module includes a power source.

In accordance with another aspect of the present invention, a method of tracking subjects on a construction site includes providing a tracking module for placement on the subject, wherein the tracking module includes a short-range frequency emitter and wherein the tracking module emits a signal. The sensor module is provided to be placed at locations around the construction site. The sensor module includes a short-range radio frequency emitter/receiver and a microcontroller. The sensor module is configured to receive the signal from the tracking module and to triangulate a position of the sensor.

In accordance with yet another aspect of the present invention, the tracking module is configured to be disposed in a hard hat. The tracking module is equipped with an LED light. The LED light is configured to be lit when the tracking module is operating and configured to turn off when the tracking module is not operating. The sensor module is configured for placement in construction machinery. The sensor module is configured to provide an alert if the tracking module is within a predetermined proximity, and the tracking module is also configured to provide an alert if the tracking module is within a predetermined proximity of the sensor module. The sensor module is configured to provide an alert if the tracking module is unauthorized to be in an area of the construction site, and the tracking module is also configured to provide an alert if the tracking module is unauthorized to be in an area of the construction site.

DETAILED DESCRIPTION OF THE PREFERRED EMBODIMENTS

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

The present invention provides a system and method for increasing construction site safety. The present invention reduces the risk of a construction or similar large vehicle or piece of mobile machinery hitting a construction worker. The system uses low-power wireless beacons embedded in a construction worker's hardhat or otherwise on the construction worker's person. The low-power wireless beacon interacts with sensor modules around the construction site, on construction vehicles, on construction equipment, or any other suitable placement known to or conceivable by one of skill in the art. The sensor modules send alert signals to a display accessible to a driver of the vehicle, and/or a foreman on the construction site. While the present invention is discussed herein in the context of construction safety, it should be noted that such a system can be applied to any situation where tracking and alert generation would be beneficial.

More particularly, the system of the present invention includes a sensor module and a low power wireless beacon, in order to track the proximity of workers to potentially dangerous equipment or situations. The sensor module can include a microcontroller and a short-range radio frequency (RF) emitter/receiver, such as a Bluetooth® emitter/receiver. The sensor module is used to listen to radio-frequency emissions from a beacon on the subject of the tracking and can be configured to display information to an operator of the machinery and/or a site foreman. The display can take the form of an independent display, a display incorporated into the sensor module, a personal device display such as on a smartphone or tablet, or other suitable computing display known to or conceivable by one of skill in the art. The sensor module can include a battery, hard wiring into the machinery power source, plug-in power, a rechargeable battery or any other suitable solution for providing power to the sensor module. The sensor module can also be incorporated into a smartphone, tablet, phablet, personal computer, equipment computer, or any other suitable computing device which provides a display and a source or power and recharging. Information regarding the proximity of the sensor and the beacon can be transmitted from the sensor module via the microcontroller to the display device via wired or wireless communication over a network.

The beacon can take the form of a Bluetooth® low energy (BLE) beacon or any other low-frequency radio frequency emitting device suitable for the purpose. With trilateration based on signal strength of each sensor, an approximate vector of the construction worker relative to the machinery can be determined. The beacon can include a standard battery, a rechargeable battery for use with a charger, or other suitable solution for providing power to the device. The beacon can be manufactured into a standard construction hard hat or can be a standalone device that the construction worker can wear, keep in pocket, clip to the hat or a belt, or any other suitable placement. It is, however, preferable to incorporate the beacon into the hard hat to make sure that the beacon is being worn. Hard hat compliance is a standard requirement throughout the construction industry.

The beacon can also include an LED that is lit when the beacon is functioning properly, and the LED is configured to turn off if the beacon fails to function. If the LED is off, and the beacon is failing to function the beacon emits a low-frequency RF signal for 100M radius to signify that the beacon has a low battery. Nearby drivers and site managers are alerted to keep the worker safe and also to provide the worker with a replacement beacon, beacon equipped hard hat, replacement battery or other safety solution.

FIG. 1 illustrates a schematic diagram of a system for tracking a subject, according to an embodiment of the present invention. As illustrated in FIG. 1, the system 10 includes a hard hat 12 fitted with beacon 14 and being worn by construction worker 16. The beacon transmits a low radio-frequency signal 18. The signal 18 is received by a short-range radio frequency receiver that is part of the sensor module 20 installed on construction vehicle 22. A number of sensors 20 receive signal 18 and triangulation is used to determine the position of the worker relative to the sensors.

The construction vehicle 22 can include a number of sensor modules 20 in order for the operator to have a better idea of where the worker is in proximity to the vehicle. This also allows the construction vehicle operator to properly avoid the worker. The beacon and/or sensor can also be configured to audibilize to warn the worker if he/she is in dangerous proximity to heavy machinery.

The nature of the system allows for hard hats and trackers to be assigned to a specific worker, class of worker, visitors, managers, etc. In this way, if desired the specific worker can be located within the worksite. This can be done for safety or in addition, for tracking worker efficiency or redirecting a worker to an area where more workers are needed. Hard hats enabled with trackers can also be given to visitors, day workers, etc. so that they can be protected and tracked around the worksite. The visitor hats can be designated within the software in order to allow a foreman or a manager to make sure visitors or day workers are in designated areas. Visitors can be identified with numbers or a different color or shape within the display of the software. This provides safety and security around the worksite. Hardhats enabled with beacons or standalone beacons are also configured to alert a wearer if he or she is too close to potential dangerous construction equipment. The beacon can emit a sound, haptic feedback, or other suitable alert, known to or conceivable by one of skill in the art.

Figure 2:
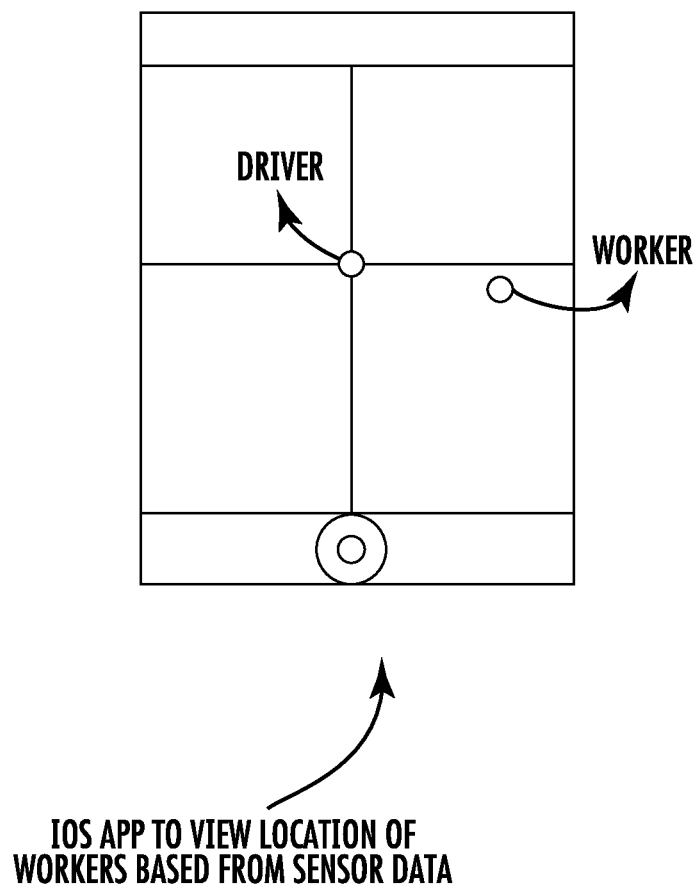
FIG. 2 illustrates a schematic diagram of a display of proximity between tracking beacon and sensing module, according to an embodiment of the present invention.

FIG. 2 illustrates a schematic diagram of a display of proximity between tracking beacon and sensing module, according to an embodiment of the present invention. FIG. 2 illustrates an exemplary display screen for use with the system. The display can be that of a smartphone or other computing device and can include software to be programmed into a non-transitory computer readable medium for displaying information regarding proximity of beacons and sensors. The software can be implemented in the form of a computer program or a computer program application for use with a smartphone or tablet.

It should be noted that the tracking protocols, described herein can be executed with a program(s) fixed on one or more non-transitory computer readable medium. The non-transitory computer readable medium can be loaded onto a computing device, server, imaging device processor, smartphone, tablet, phablet, or any other suitable device known to or conceivable by one of skill in the art.

Figure 3:
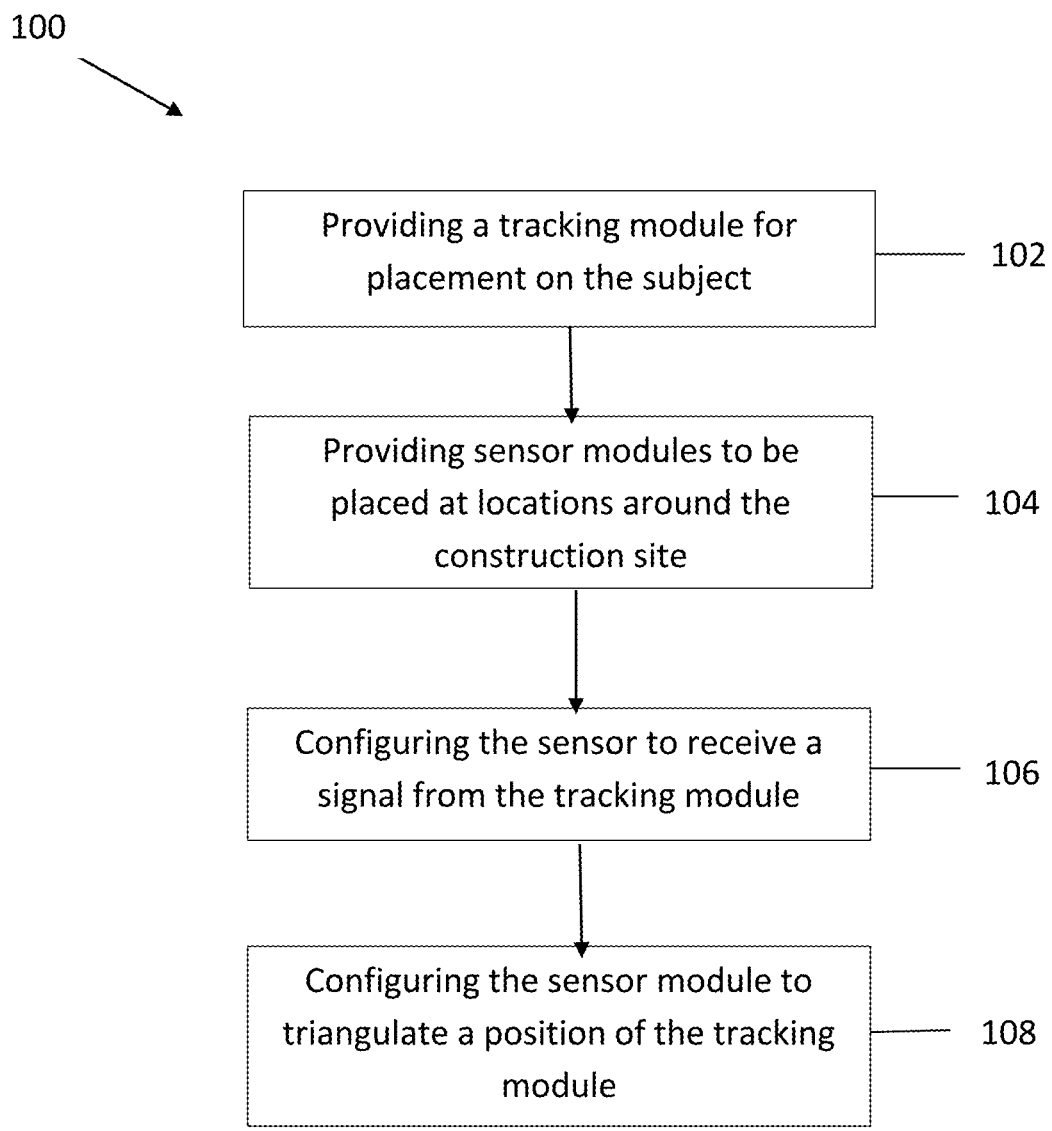
FIG. 3 illustrates a flow diagram of a method according to an embodiment of the present invention.

FIG. 3 illustrates a flow diagram of a method according to an embodiment of the present invention. A method 100 according to an embodiment of the present invention includes step 102 of providing a tracking module for placement on the subject. Step 104 includes providing sensor modules to be placed at locations around the construction site. Step 106 includes configuring the sensor to receive a signal from the tracking module and step 108 includes configuring the sensor module to triangulate a position of the tracking module. This step can be executed with a non-transitory computer readable medium programmed for tracking the tracking module and displaying information to a user.

The method can further include configuring the tracking module to be disposed in a hard hat. The tracking module can be equipped with an LED and the LED can be configured to remain lit while the tracking module is operational and to turn-off when the tracking module is not operational. The sensor module can be configured to be placed in construction machinery. The sensor module can be configured to provide an alert if a tracking module is within a predetermined proximity, and the tracking module can also be configured to provide an alert if the tracking module is within a predetermined proximity to a sensor module. The sensor module and tracking module can also be configured to provide alerts if a tracking module is positioned in an unauthorized area of the construction site. In some embodiments there can be lights or other signals on or near the sensor modules around periphery of equipment to show workers that their beam signal is being received by the sensors, as an additional safety measure. The sensor signals and/or computed locations of workers around the equipment could be fed into the control system of the vehicle so that if the operator attempts to steer or pivot the equipment in the direction of a worker, the system could implement a fail-stop procedure to halt the action and issue an alarm or some other form of alert.

It should also be noted that herein the steps of the method described can be carried out using a microcontroller, microprocessor, computer, non-transitory computer readable medium, or alternately a computing device, microprocessor, or other computer type device independent of or incorporated with existing construction management systems, vehicle control systems, or any other suitable solution known to or conceivable by one of skill in the art. An independent computing device can be networked together with the imaging device either with wires or wirelessly. Indeed, any suitable method of analysis known to or conceivable by one of skill in the art could be used. It should also be noted that while specific equations are detailed herein, variations on these equations can also be derived, and this application includes any such equation known to or conceivable by one of skill in the art.

The short-range radio frequency technology referred to herein operates at 2.4 GHz and is capable of transmitting voice and data. Data is transferred at the rate of 1 Mbps, which is from three to eight times the average speed of parallel and serial ports, respectively. Such short-range radio frequency devices switch frequencies at a rapid pace (1,600 times per second) and the data packets are so small that interference from other RF sources is highly unlikely. The short-range radio frequency technology described herein can take the form of a Bluetooth® device, a Bluetooth® low energy device (BLE device), or any other wireless technology known to or conceivable by one of skill in the art and suitable for the purpose.

A non-transitory computer readable medium is understood to mean any article of manufacture that can be read by a computer. Such non-transitory computer readable media includes, but is not limited to, magnetic media, such as a floppy disk, flexible disk, hard disk, reel-to-reel tape, cartridge tape, cassette tape or cards, optical media such as CD-ROM, writable compact disc, magneto-optical media in disc, tape or card form, and paper media, such as punched cards and paper tape.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A system for tracking proximity of a tracking module to a sensing module comprising:
    a sensor module having a short-range radio frequency emitter/receiver and a microcontroller;
    a tracking module having a short-range frequency emitter wherein the short-range frequency emitter takes the form of a Bluetooth® Low Energy transmitter and the short-range frequency emitter is configured to transmit signal over a predetermined site and an LED light, wherein the LED light is configured to be lit when the tracking module is operating and off when the tracking module is not operating;
    wherein the tracking module emits a signal received by the sensor module and triangulation is used to determine proximity of the tracking module to the sensor module; and
    a display, wherein the display is in communication with the sensor module, such that the sensor module transmits data for display related to the proximity of the tracking module to the sensor module.

2. The system of claim 1 wherein the tracking module is part of a hard hat.

3. The system of claim 1 further configured for use in a construction site.

4. The system of claim 1 wherein several sensor modules are placed around the perimeter of construction equipment.

5. The system of claim 1 wherein the display is incorporated into one selected from a group consisting of a smartphone, tablet, phablet, computing device, personal computer, and construction equipment computer.

6. The system of claim 1 wherein the system is configured with trileration based on signal strength of the sensor module such that a vector corresponding to the short-range frequency emitter is determined.

7. The system of claim 1 further comprising a network for facilitating communication between the sensor module, the tracking module, and the display.

8. The system of claim 1 wherein the tracking module includes a battery.

9. The system of claim 8 wherein the battery is rechargeable.

10. The system of claim 1 wherein the sensor module includes a power source.

11. A method of tracking subjects on a construction site comprising:
    providing a tracking module for placement on the subject, wherein the tracking module includes a short-range frequency emitter wherein the short-range frequency emitter takes the form of a Bluetooth® Low Energy transmitter and the short-range frequency emitter is configured to transmit signal over a predetermined site, wherein the tracking module emits a signal;
    providing a sensor module to be placed at locations around the construction site, wherein the sensor module includes a short-range radio frequency emitter/receiver and a microcontroller;
    configuring the sensor module to receive the signal from the tracking module; and
    configuring the sensor module to triangulate a position of the sensor.

12. The method of claim 11 further comprising configuring the tracking module to be disposed in a hard hat.

13. The method of claim 11 further comprising equipping the tracking module with an LED light.

14. The method of claim 13 further comprising configuring the LED light to be lit when the tracking module is operating.

15. The method of claim 13 further comprising configuring the LED to turn off the tracking module is not operating.

16. The method of claim 11 further comprising configuring the sensor module for placement in construction machinery.

17. The method of claim 11 further comprising configuring the sensor module to provide an alert if the tracking module is within a predetermined proximity.

18. The method of claim 11 further comprising configuring the tracking module to provide an alert if the tracking module is within a predetermined proximity of the sensor module.

19. The method of claim 11 further comprising configuring the sensor module to provide an alert if the tracking module is unauthorized to be in an area of the construction site.

20. The method of claim 11 further comprising configuring the tracking module to provide an alert if the tracking module is unauthorized to be in an area of the construction site.

* * * * *